US012197989B2

(12) United States Patent
Weakley (10) Patent No.: US 12,197,989 B2
(45) Date of Patent: Jan. 14, 2025

(54) RFID LABEL FOR ATTACHMENT TO METALLIC ITEMS

(71) Applicant: CHECKPOINT SYSTEMS, INC., Thorofare, NJ (US)

(72) Inventor: Thomas Weakley, Cherry Hill, NJ (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 18/291,320

(22) PCT Filed: Jun. 22, 2023

(86) PCT No.: PCT/US2023/025925
§ 371 (c)(1),
(2) Date: Jan. 23, 2024

(87) PCT Pub. No.: WO2023/250056
PCT Pub. Date: Dec. 28, 2023

(65) Prior Publication Data
US 2024/0265229 A1 Aug. 8, 2024

Related U.S. Application Data

(60) Provisional application No. 63/354,313, filed on Jun. 22, 2022.

(51) Int. Cl.
*G06K 19/077* (2006.01)
*G06K 19/07* (2006.01)
*H01Q 1/22* (2006.01)

(52) U.S. Cl.
CPC ... *G06K 19/07773* (2013.01); *G06K 19/0723* (2013.01); *H01Q 1/2208* (2013.01)

(58) Field of Classification Search
CPC ......... G06K 19/07773; G06K 19/0723; G06K 19/07; G06K 19/00; H01Q 1/2208
(Continued)

(56) References Cited

U.S. PATENT DOCUMENTS 6,147,604 A * 11/2000 Wiklof ............. G06K 19/07749
235/487
8,576,050 B2 11/2013 Hansen
(Continued)

FOREIGN PATENT DOCUMENTS

EP          1887495 A2      2/2008
WO   WO-2024010845 A1 *   1/2024   ......... G08B 13/2437

OTHER PUBLICATIONS

Patent Cooperation Treaty (PCT), International Search Report and Written Opinion for Application PCT/US2023/025925 filed on Jun. 22, 2023, mailed Oct. 12, 2023, International Searching Authority, EP.

*Primary Examiner* — Edwyn Labaze
(74) *Attorney, Agent, or Firm* — McDonald Hopkins LLC (57) ABSTRACT

A RFID label is shown and described herein. The RFID label having a combined structure with an RFID component layer and an inductive component layer separated by and placed on opposite sides of a dielectric substrate. The RFID component layer including an antenna segment with an integrated circuit located along the antenna segment. A first and second capacitor assembly couples the RFID component layer to the inductive component layer. The combined structure is adhered to a spacer layer. The antenna segment radiates a plane wave when the combined structure is coupled to a ground plane.

30 Claims, 5 Drawing Sheets

(58) Field of Classification Search
USPC .............................. 235/492, 487, 380, 375
See application file for complete search history.

(56) References Cited

U.S. PATENT DOCUMENTS

| | | | |
|---|---|---|---|
| 2005/0134506 A1* | 6/2005 | Egbert | H01Q 1/2208 |
| | | | 343/867 |
| 2010/0253583 A1* | 10/2010 | Furutani | G06K 19/07749 |
| | | | 343/702 |
| 2016/0181868 A1* | 6/2016 | Casse | H01Q 1/248 |
| | | | 307/104 |

* cited by examiner

RFID LABEL FOR ATTACHMENT TO METALLIC ITEMS

CROSS-REFERENCE TO RELATED APPLICATION

This application is a 35 U.S.C. § 371 national stage application of PCT Application No. PCT/US2023/025925 filed on Jun. 22, 2023 titled "RFID LABEL FOR ATTACHMENT TO METALLIC ITEMS" which claims the priority benefit of U.S. Provisional Patent Application Ser. No. 63/354,313 titled "RFID LABEL FOR ATTACHMENT TO METALLIC ITEMS" filed on Jun. 22, 2022, each of which is are hereby incorporated by reference in their entireties.

FIELD OF INVENTION

The present invention relates to a radio frequency identification (RFID) label. In particular, the present invention relates to a RFID label suitable for mounting on a metallic object without any degradation in performance such as, for example, sensitivity & read range.

BACKGROUND

RFID labels are attached to or associated with items to track inventory. They can be used on a variety of items such as packages, pallets, containers, etc. The labels can be encoded with identifying information related to the tagged item. The label can be read by a scanner or reader that can decode the information on the chip and display information related to the label or package on a display device.

Standard RFID labels are generally not suitable for tagging conductive materials or materials having a high dielectric constant. When label approaches such objects, the RFID antenna becomes detuned (mismatch loss). The efficiency in which the antenna generates a plane wave is also reduced (radiation efficiency loss). These losses severely reduce the antenna's read range. Therefore, communication with such tags are is difficult, which leads to ineffectiveness and inconsistencies in tracking items.

One approach to overcoming these issues is to place a standard RFID inlay on a spacer material where the inlay is positioned a fixed distance from the conductive object. To completely isolate the RFID label from the object, the spacer needs to be a quarter of a wavelength thick based on the dielectric constant of the material used in creating the spacer. That requirement results in constructions having a thickness that is not suitable for customer's purposes and may be too thick for printing and encoding processes.

In other constructions, manufacturers have often selected antenna structures intended for use above a ground plane, using the metallic object as the ground plane. These structures also require a dielectric spacer, typically foam or rubber, but are considerably thinner than described in the previous example. The drawback of these antenna structures is that they are generally larger in size. For example, RFID inlays disposed on spacers of foam or rubber may have to be in excess of 75 mm in length and 50 mm in width. That increases the cost of the products and may not be suitable for customers in terms of aesthetics.

Still another approach is to employ a structure that resonates in the presence of a ground plane such as, for example, a metallic item that receives a RFID tag. In labels that are currently able to function in this manner, the resonant structure needs to wrap around opposite ends of the spacer for coupling to the ground plane. While these types of structures do demonstrate better radiation efficiencies with thinner spacers than is required for the other approaches described above, construction and manufacturing of such labels is complex and requires specialized equipment and capital expense.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a RFID label suitable for tagging metallic objects. The RFID label has an antenna configuration such that the antenna resonates in the presence of a ground plane. The label has a profile or footprint that is suitable for labeling applications and still provides excellent sensitivity in the radio frequency range such that the label exhibits good read range.

In one aspect, a RFID label comprises a RFID component disposed on a first side of a dielectric substrate, an inductor element disposed on a second side of the dielectric substrate opposite the first side, and a spacer layer overlying the inductor layer. The RFID component is coupled to capacitor elements. The inductor element is in parallel with the RFID component. The antenna resonates and radiates a plane wave when placed on a ground plane (metallic object). The antenna exhibits excellent sensitivity in the radio frequency band.

According to one aspect of the present invention, an RFID label includes a combined structure having an RFID component layer and an inductive component layer separated by and placed on opposite sides of a dielectric substrate. The RFID component layer includes an antenna segment having a first antenna segment and a second antenna segment. An integrated circuit located along the first antenna segment, a first capacitor segment attached to the first and second antenna segments, and a second capacitor segment attached to the first and second antenna segments. The first capacitor segment is located on an opposite distal end of the antenna segment from the second capacitor segment.

The inductive component layer having a first capacitor segment and a second capacitor segment being joined by a trace. The first capacitor segment of the inductive component aligns and couples with the first capacitor segment of the RFID component layer, thereby forming a first capacitor assembly. The second capacitor segment of the inductive component aligns and couples with the second capacitor segment of the RFID component layer, thereby forming a second capacitor assembly. The first and second capacitor assembly couples the RFID component layer and the inductive component layer. The combined structure is adhered to a spacer layer. The antenna segment radiates a plane wave when the combined structure is coupled to a ground plane.

In an exemplary embodiment, the ground plane is an item having metallic packaging to which the spacer layer is adhered. The combined structure and item are located on opposite sides of the spacer layer.

In a further embodiment, the ground plane is a foil layer placed on the spacer layer. The foil layer and combined structure are located on opposite sides of the spacer layer.

In an additional embodiment, the foil layer has an adhesive layer opposite the spacer layer for attaching the RFID label to an item.

In another embodiment, the foil layer has a thickness between about 1 to about 30 microns.

In a further embodiment, the foil layer has a thickness of 5,000 Angstroms or less.

In an additional embodiment, the foil layer has a thickness of 1,000 Angstroms of less.

In another embodiment, the dielectric substrate has a thickness between about 0.010 mm to about 0.050 mm.

In a further embodiment, the dielectric substrate has a thickness between about 0.015 mm to about 0.04 mm.

In an additional embodiment, the dielectric substrate has a thickness between about 0.02 mm to about 0.03 mm.

In another embodiment, the spacer layer has a thickness between about 0.25 mm to about 1 mm.

In a further embodiment, the spacer layer has a thickness between about 0.3 mm to about 0.8 mm.

In an additional embodiment, the spacer layer has a thickness between about 0.4 mm to about 0.6 mm.

In another embodiment, the dielectric substrate, the spacer layer, or both are formed of a closed cell foam material.

According to another aspect of the invention, a method of tracking an item includes applying an RFID label to the item. The RFID label having a combined structure comprising an RFID component layer and an inductive component layer separated by and placed on opposite sides of a dielectric substrate.

The RFID component layer includes an antenna segment having a first antenna segment and a second antenna segment. An integrated circuit is located along the first antenna segment. A first capacitor segment is attached to the first and second antenna segments. A second capacitor segment is attached to the first and second antenna segments. The first capacitor segment is located on an opposite distal end of the antenna segment from the second capacitor segment.

The inductive component layer has a first capacitor segment and a second capacitor segment being joined by a trace. The first capacitor segment of the inductive component aligns and couples with the first capacitor segment of the RFID component layer, forming a first capacitor assembly. The second capacitor segment of the inductive component aligns and couples with the second capacitor segment of the RFID component layer, forming a second capacitor assembly. The first and second capacitor assembly coupling the RFID component layer and the inductive component layer. The combined structure is adhered to a spacer layer. The item has metallic packaging to which the spacer layer of the RFID label is adhered. The metallic packaging functions as a ground plane for the combined structure, when the metallic packaging is coupled to the combined structure. The antenna segment radiates a plane wave, when the combined structure is coupled to the metallic packaging.

According to yet another aspect of the invention, an item having an RFID label includes the RFID label having a combined structure having an RFID component layer and an inductive component layer separated by and placed on opposite sides of a dielectric substrate. The RFID component layer having an antenna segment with a first antenna segment and a second antenna segment, an integrated circuit located along the first antenna segment, a first capacitor segment attached to the first and second antenna segments, and a second capacitor segment attached to the first and second antenna segments. The first capacitor segment is located on an opposite distal end of the antenna segment from the second capacitor segment.

The inductive component layer having a first capacitor segment and a second capacitor segment being joined by a trace. The first capacitor segment of the inductive component aligns and couples with the first capacitor segment of the RFID component layer, thereby forming a first capacitor assembly. The second capacitor segment of the inductive component aligns and couples with the second capacitor segment of the RFID component layer, thereby forming a second capacitor assembly. The first and second capacitor assembly couples the RFID component layer and the inductive component layer. The combined structure is adhered to a spacer layer. The item having metallic packaging to which the spacer layer of the RFID label is adhered. The metallic packaging is a ground plane for the combined structure, when the metallic packaging is coupled to the combined structure. The antenna segment radiates a plane wave when the combined structure is coupled to the metallic packaging.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Provided is a RFID label suitable for use on metallic items. Such items are known to detune conventional RFID labels. The present RFID labels comprise a RFID component layer defined as a parallel configuration of a resistor and a capacitor, and an inductive component layer placed in parallel with the RFID component player. The RFID component layer is further comprised of an antenna segment. The RFID component layer and the inductive component layer are separated by a dielectric layer. The RFID component layer and the inductor component layer are coupled together by a first capacitor assembly and a second capacitor assembly. The first and second capacitor assemblies are formed by elements on opposite sides of the RFID antenna and the inductive component layer.

FIGS. 1-4 shows an embodiment of an RFID label in accordance with the present technology. The RFID label 100 includes a RFID component layer 110 disposed on a first side of a dielectric substrate 120, and an inductive component layer 130 disposed on a second side of dielectric substrate 120 opposite the first side. A spacer layer 140 is disposed over the inductive component layer 130 opposite the dielectric substrate 120.

The RFID component layer 110 comprises an antenna segment 112 defined by traces 112a and 112b. The RFID component layer includes an integrated circuit 118 attached to a portion of the antenna segment 112 (112b in FIG. 2). The RFID component layer 110 includes capacitor segments 114a and 114b on opposite distal ends of the antenna segment 112.

Figure 3:
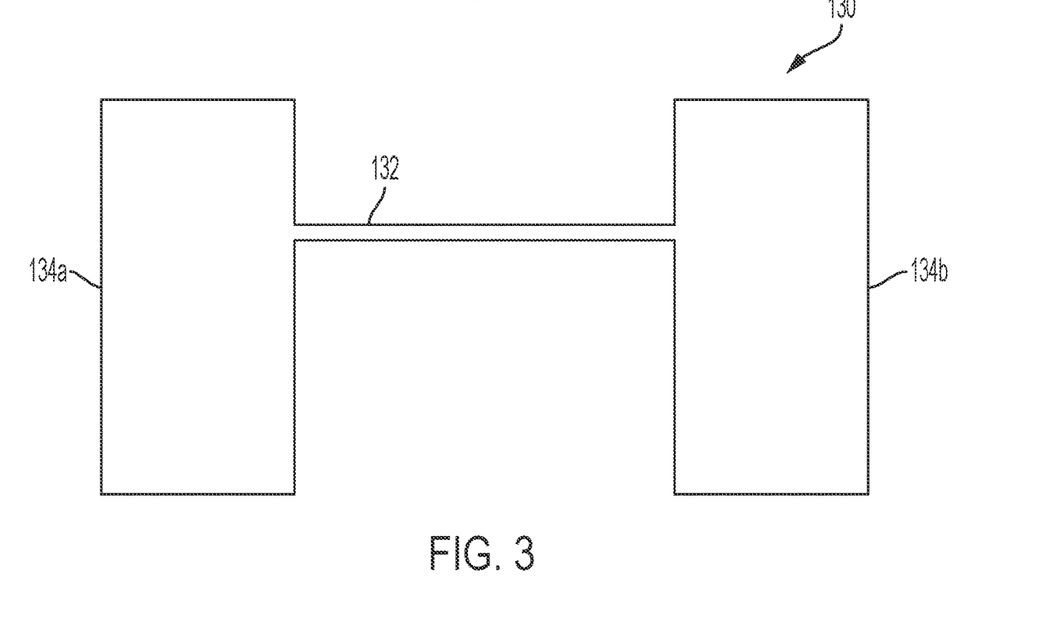
FIG. 3 is an embodiment of a inductor layer of the label.

The inductive component layer 130 is formed from a trace 132 and rectangular capacitor segments 134a and 134b that align with the capacitor segments 114a and 114b of the RFID component layer 110. The capacitor segments 114a and 114b of the RFID component layer 110 couple with the capacitor segments 134a and 134b of the inductive component layer 130, thereby coupling the RFID component layer 110 and the inductive component layer 130.

Figure 2:
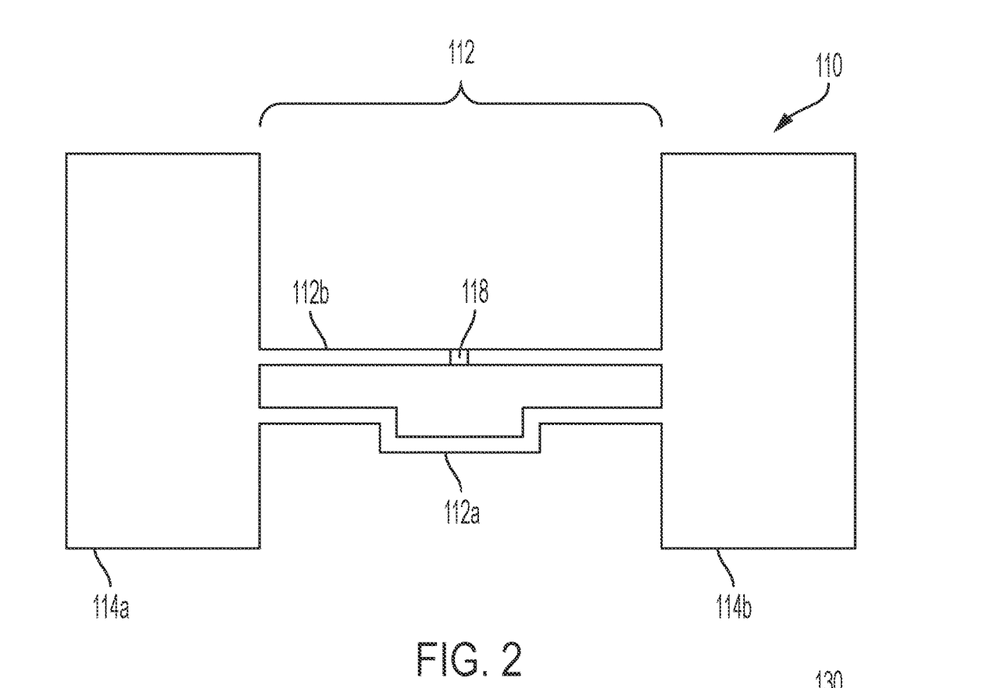
FIG. 2 is an embodiment of a RFID layer of the label.

Further, the first capacitor segment 134a of the inductive component layer 130 aligns and couples with the first capacitor segment 114a of the RFID component layer 110, thereby forming a first capacitor assembly 160 of the RFID label 100. The second capacitor segment 134b of the inductive component layer 130 aligns and couples with the second capacitor segment 114b of the RFID component layer 110, thereby forming a second capacitor assembly 165 of the RFID label 100.

Figure 4:
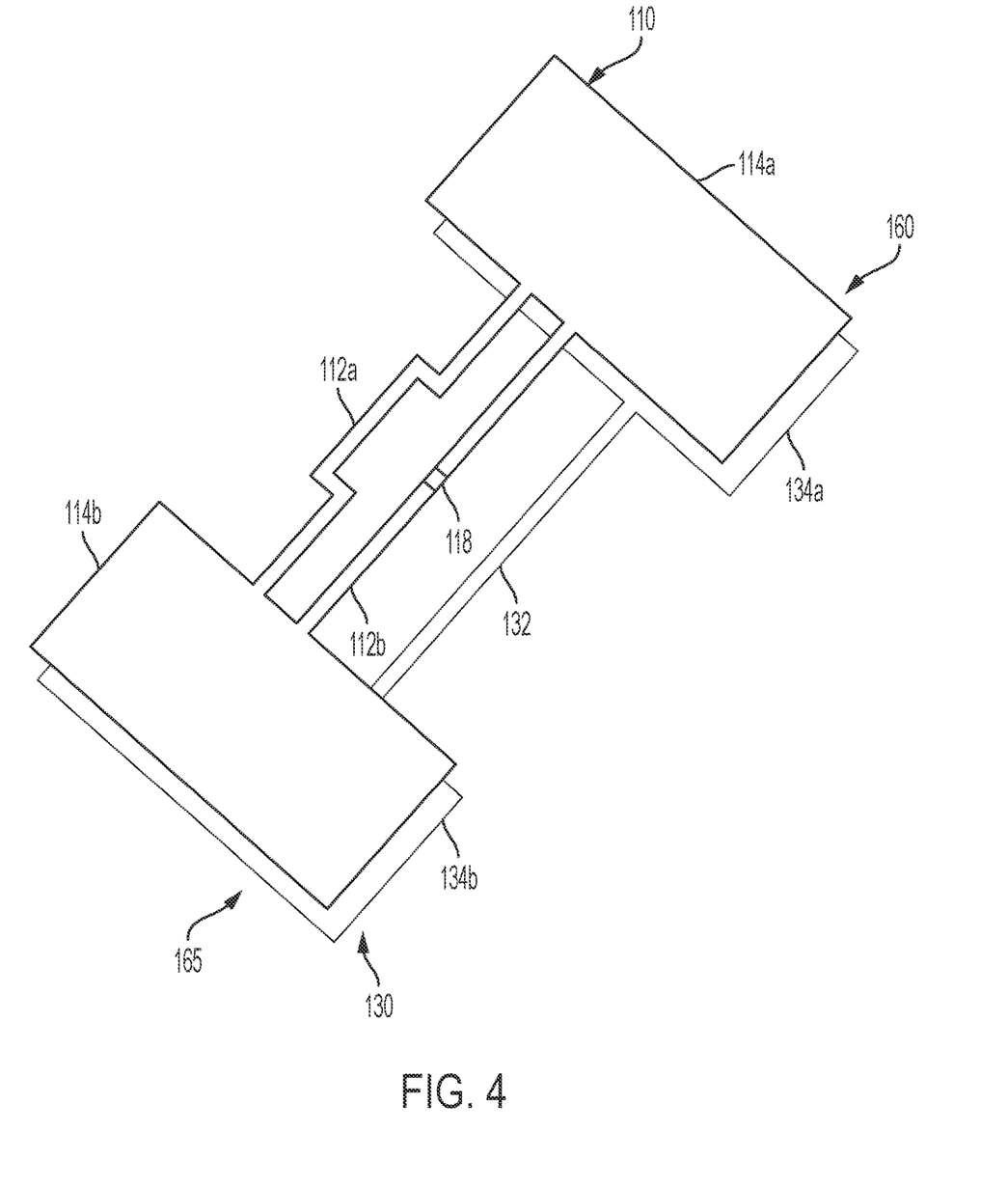
FIG. 4 is a perspective view showing the arrangement of the RFID layer and the inductive layer with the dielectric substrate and spacer layer not shown.

FIG. 4 shows the arrangement or orientation of the RFID component layer 110 and the inductive component layer 130 relative to one another in space within the label 100. The dielectric substrate layer 120 and spacer layer 140 are not shown in FIG. 4.

The RFID component layer 110 and the inductive component layer 130 may be formed as electrically conductive traces formed on the dielectric substrate layer 120. The conductive traces can be formed from any suitable material. Examples of suitable material includes, but is not limited to, copper, aluminum, silver, gold, other metals, or carbon. The antennas 112 may also be printed in conductive inks comprising dispersions of silver, gold, or other metals, or particles coated with silver, gold or other metallic conductors, or nonmetallic conductors such as carbon or polyaniline. The antennas 112 can be manufactured using commercially available flexible circuits that are produced using processes and designs of proven high yield.

The dielectric substrate 120 and spacer layer 140 can be formed from any suitable dielectric material. Examples of suitable dielectric materials include, but are not limited to, paper, foam, rubber, a polymeric material, a ceramic material and the like. In one embodiment, the spacer layer 140 is selected from paper. In one embodiment, the spacer layer 140 is formed from a foam material.

In one embodiment, the dielectric substrate 120 can have a thickness of from about 0.010 mm to about 0.050 mm, from about 0.015 mm to about 0.04 mm, or from about 0.02 mm to about 0.03 mm. In one embodiment, the spacer layer 140 can have a thickness of from about 0.25 mm to about 1 mm, from about 0.3 mm to about 0.8 mm, or from about 0.4 mm to about 0.6 mm. The present antenna structure allows for providing a thinner profile than is possible with a conventional RFID antenna configuration.

The label 100 can be formed by providing or forming the RFID component layer 110 to a surface on one side of a dielectric substrate 120. The integrated circuit 118 may be attached to the RFID antenna segment 112 by any suitable means prior to or subsequent to the RFID component layer 118 being provided on the dielectric substrate 120. The inductive component layer 130 is also formed on the dielectric substrate 120. The order in which the RFID component layer 118 and the inductive component layer 130 are formed on the dielectric substrate 120 is not critical, as long as the RFID component layer 118 and inductive component layer 130 are located on opposite sides of the dielectric substrate 120. The RFID component layer 118, inductive component layer 130, and dielectric substrate 120 form a combined structure 170. After the combined structure 170 is formed comprised of the RFID component layer 118, dielectric substrate layer 120, and inductive component layer 130, the combined structure 170 is attached to a top surface of a spacer layer 140. This can be accomplished using any suitable method. In one embodiment the combined structure 170 is adhered to the spacer layer 140. An adhesive layer 175 may be provided on the underside of the spacer layer 140, opposite of the combined structure 170, to allow for attachment of the label 100 to an item.

Figure 1:
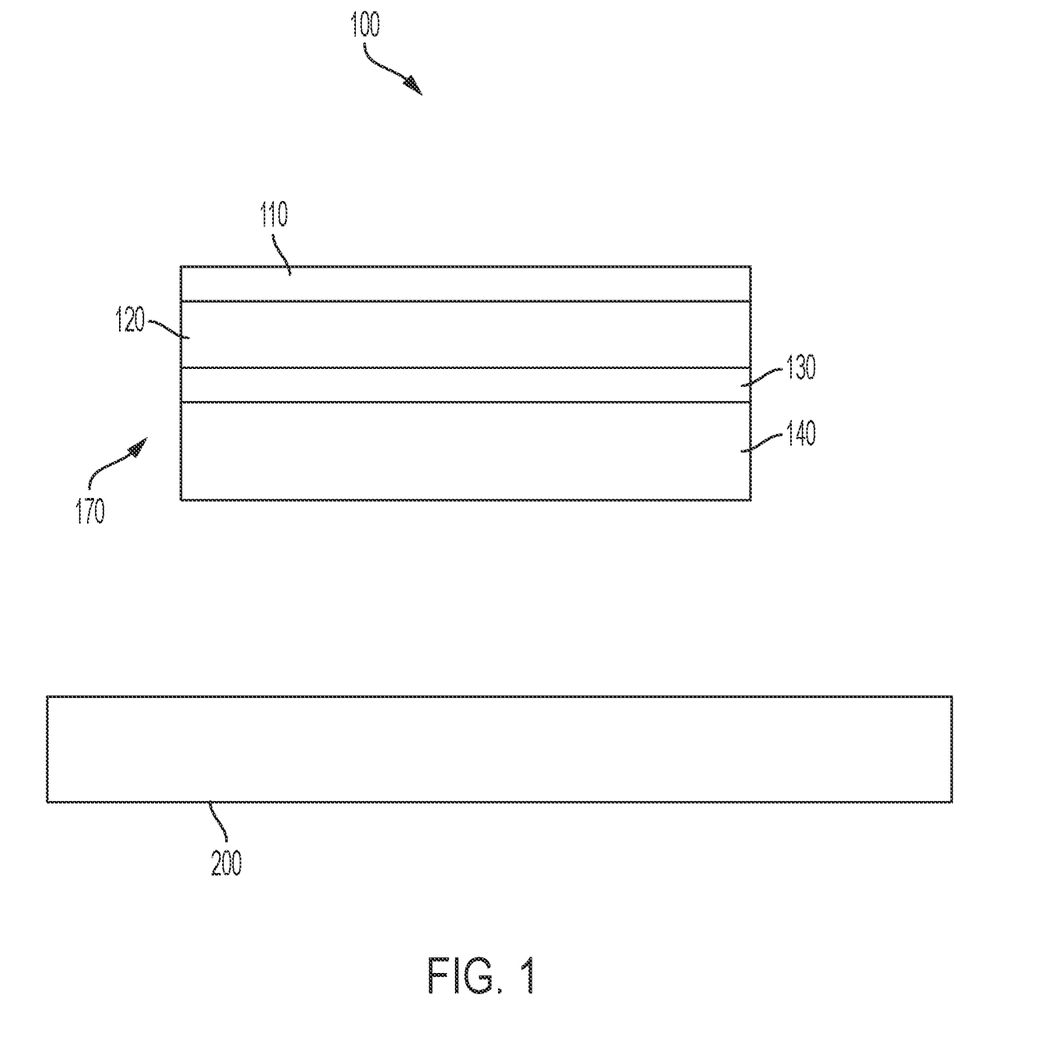
FIG. 1 is a schematic view of a cross-section of a RFID label in accordance with an embodiment of the invention.

When the RFID label 100 is placed on a ground plane, e.g., a metallic substrate 200 as shown in FIG. 1, the entire structure begins to radiate a plane wave. Stated alternatively, the antenna RFID antenna segment 112 radiates a plane wave when the combined structure 170 is placed on a ground plane 200. Stated otherwise, the antenna RFID antenna segment 112 radiates a plane wave when the combined structure 170 is coupled to a ground plane 200. The label 100 exhibits excellent sensitivity in the radio frequency band when placed in the proximity of a ground plane. Stated alternatively, the RFID antenna segment 112 of label 100 exhibits excellent sensitivity when coupled to a ground plane 200. The sensitivity allows the label to be suitable for labeling items 180 having sufficient metal content to act as a ground plane 200.

Figure 5:
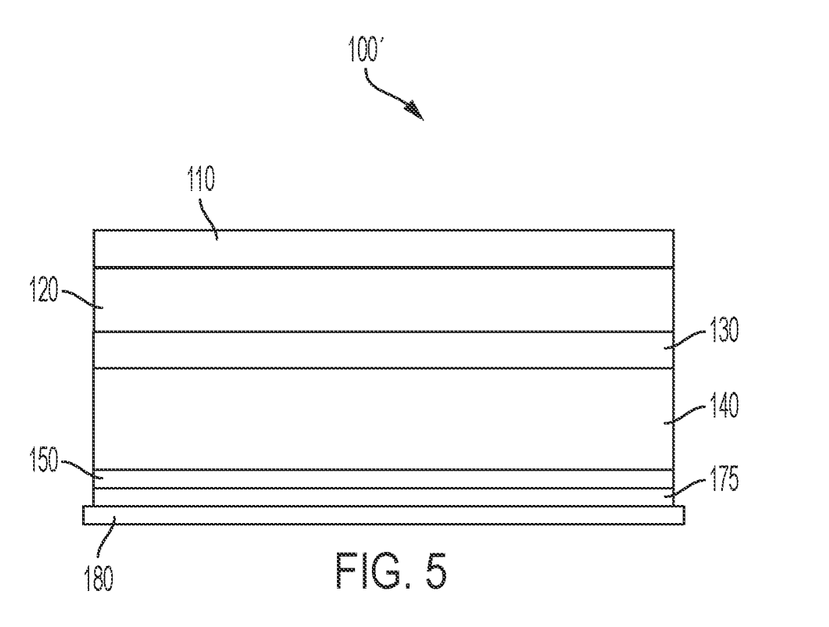
FIG. 5 is a cross-section of a RFID label in accordance with another embodiment of the invention.

In one embodiment, when the item to which the label will be applied is an item 180 made of a material with a high dielectric constant that is not metal or does not contain a substantial quantity of a metal material to act as a ground plane 200, the label 100 structure may include an additional layer of a metallic foil 150 that may function as ground plane 200. FIG. 5 illustrates an embodiment, the RFID label 100' includes the same structural layers shown in FIG. 1 but further includes a foil layer 150. The foil layer 150 can be selected as desired. The foil layer 150 can be provided by a self-supporting sheet of metal. The foil layer 150 provided by a self-supporting sheet can have a thickness of from about 1 to about 30 micron. In another embodiment, the foil layer 150 can be provided by a plastic film layer sputtered or vacuum metalized with a thin layer of continuous metal.

Sputtering can lay down a continuous metal coating of 5000 Angstroms or less. Vacuum metallizing can lay down a metal coating of 1000 Angstroms or less. Vacuum metallizing and sputtering, as generally practiced, provide a continuous layer of metal mounted on the plastic. In one embodiment, the metal forming the foil layer is aluminum. The foil layer 150 can be applied in any suitable manner such as bonding, welding, or otherwise adhering the foil layer 150 to the spacer layer 140, opposite of the combined structure 170. An adhesive layer 175 can be applied to the back side of the foil layer 150, opposite of the spacer layer 140, for adhering the RFID label 100' to an item.

Examples

Resonant antenna segments 112 were constructed with a structure and antenna configuration as depicted in FIGS. 1-4. The dielectric substrate 120 and the spacer layer 140 were formed from a closed cell foam material.

Antenna segments 112 were constructed with the following dimensions:

TABLE 1

| Length - Width (mm) | Area (mm$^2$) | Spacer Thickness (mm) | Minimum Sensitivity (dBm) | 1 dB Bandwidth (MHz) |
| --- | --- | --- | --- | --- |
| 50 × 25 | 1,250 | 1.0 | −5.0 | 55.0 |
| 55 × 18 | 990 | 1.0 | −5.0 | 33.0 |
| 60 × 12 | 720 | 1.0 | −5.0 | 27.0 |

Figure 6:
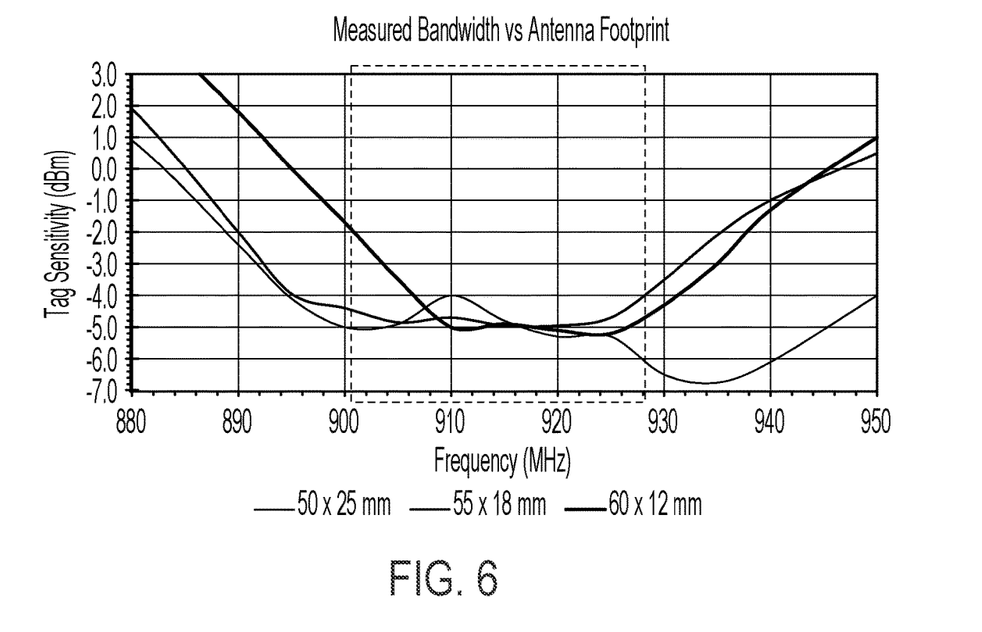
FIG. 6 is a graph showing the measured RF sensitivity of different antenna structures varying by their length and width.

The antenna segments 112 were brought in contact with (coupled with) a ground plane 200, and the RF sensitivity was measured. FIG. 6 is a graph showing the sensitivity of the antenna segments when brought in contact with a ground plane 200. As shown in FIG. 6, antenna segments 112 with the same RF sensitivity can be provided by varying the dimensions. Generally, as the width of the antenna segments 112 is reduced, the length is increased to provide the same RF sensitivity.

Antenna segments 112 were also constructed where the length was held constant at 50 mm and the width was varied. The dimensions of those structures are shown in Table 2.

TABLE 2

| Length - Width (mm) | Area (mm$^2$) | Spacer Thickness (mm) | Minimum Sensitivity (dBm) | 1 dB Bandwidth (MHz) |
| --- | --- | --- | --- | --- |
| 50 × 25 | 1,250 | 1.0 | −5.0 | 55.0 |
| 50 × 18 | 900 | 1.0 | −4.0 | 55.0 |
| 50 × 12 | 600 | 1.0 | −2.9 | N/A |

Figure 7:
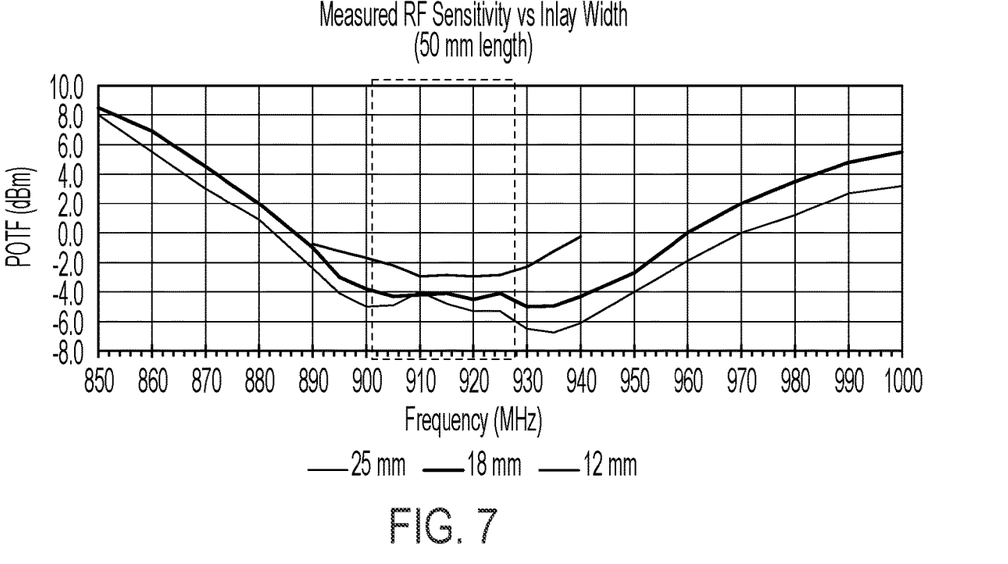
FIG. 7 is a graph showing the measured RF sensitivity of different antenna structures varying in dimension from one another by their widths.

The RF sensitivity of the antennas in Table 2 are shown in FIG. 7. As shown in the graph in FIG. 6 the antenna segments 112 generally have the same bandwidth, but sensitivity of the antenna segments 112 decreases as the footprint decreases.

As can be seen the RFID label 100 as described permits for the use of antenna segments 112 having a smaller footprint than conventional antennas and do not require the wrapping of the antenna segments 112 around the spacer layer 140 to function.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a RFID label 100. Modifications may occur to those skilled in the art and to those who may make and use the invention. The disclosed embodiments are merely for illustrative purposes and not intended to limit the scope of the invention or the subject matter set forth in the claims.

What is claimed is:

1. A RFID label comprising:
a combined structure comprising an RFID component layer and an inductive component layer separated by and placed on opposite sides of a dielectric substrate;
the RFID component layer comprising an antenna segment having a first antenna segment and a second antenna segment, an integrated circuit located along the first antenna segment, a first capacitor segment attached to the first and second antenna segments, and a second capacitor segment attached to the first and second antenna segments, with the first capacitor segment being located on opposite distal ends of the antenna segment from the second capacitor segment;
the inductive component layer having a first capacitor segment and a second capacitor segment being joined by a trace; the first capacitor segment of the inductive component aligning and coupling with the first capacitor segment of the RFID component layer, thereby forming a first capacitor assembly; the second capacitor segment of the inductive component aligning and coupling with the second capacitor segment of the RFID component layer, thereby forming a second capacitor assembly; the first and second capacitor assembly coupling the RFID component layer and the inductive component layer;
the combined structure adhered to a spacer layer;
wherein the antenna segment radiates a plane wave when the combined structure is coupled to a ground plane.

2. The RFID label of claim 1, wherein the ground plane is an item having metallic packaging to which the spacer layer is adhered; the combined structure and item being located on opposite sides of the spacer layer.

3. The RFID label of claim 1, wherein the ground plane is a foil layer placed on the spacer layer; the foil layer and combined structure being located on opposite sides of the spacer layer.

4. The RFID label of claim 3, wherein the foil layer has an adhesive layer opposite the spacer layer for attaching the RFID label to an item.

5. The RFID label of claim 3, wherein the foil layer has a thickness between about 1 to about 30 microns.

6. The RFID label of claim 3, wherein the foil layer has a thickness of 5,000 Angstroms or less.

7. The RFID label of claim 6, wherein the foil layer has a thickness of 1,000 Angstroms or less.

8. The RFID label of claim 1, wherein the dielectric substrate has a thickness between about 0.010 mm to about 0.050 mm.

9. The RFID label of claim 1, wherein the dielectric substrate has a thickness between about 0.015 mm to about 0.04 mm.

10. The RFID label of claim 1, wherein the dielectric substrate has a thickness between about 0.02 mm to about 0.03 mm.

11. The RFID label of claim 1, wherein the spacer layer has a thickness between about 0.25 mm to about 1 mm.

12. The RFID label of claim 1, wherein the spacer layer has a thickness between about 0.3 mm to about 0.8 mm.

13. The RFID label of claim 1, wherein the spacer layer has a thickness between about 0.4 mm to about 0.6 mm.

14. The RFID label of claim 1, wherein the dielectric substrate, the spacer layer, or both are formed of a closed cell foam material.

15. An item having an RFID label, comprising:
the RFID label having a combined structure comprising an RFID component layer and an inductive component layer separated by and placed on opposite sides of a dielectric substrate;
the RFID component layer comprising an antenna segment having a first antenna segment and a second antenna segment, an integrated circuit located along the first antenna segment, a first capacitor segment attached to the first and second antenna segments, and a second capacitor segment attached to the first and second antenna segments, with the first capacitor segment being located on an opposite distal ends of the antenna segment from the second capacitor segment;
the inductive component layer having a first capacitor segment and a second capacitor segment being joined by a trace; the first capacitor segment of the inductive component aligning and coupling with the first capacitor segment of the RFID component layer, thereby forming a first capacitor assembly; the second capacitor segment of the inductive component aligning and coupling with the second capacitor segment of the RFID component layer, thereby forming a second capacitor assembly; the first and second capacitor assembly coupling the RFID component layer and the inductive component layer;
the combined structure adhered to a spacer layer;
the item having metallic packaging to which the spacer layer of the RFID label is adhered, the metallic packaging is a ground plane for the combined structure when the metallic packaging is coupled to the combined structure;
wherein the antenna segment radiates a plane wave when the combined structure is coupled to the metallic packaging.

16. The item having an RFID label of claim 15, wherein the dielectric substrate has a thickness between about 0.010 mm to about 0.050 mm.

17. The item having an RFID label of claim 15, wherein the dielectric substrate has a thickness between about 0.015 mm to about 0.04 mm.

18. The item having an RFID label of claim 15, wherein the dielectric substrate has a thickness between about 0.02 mm to about 0.03 mm.

19. The item having an RFID label of claim 15, wherein the spacer layer has a thickness between about 0.25 mm to about 1 mm.

20. The item having an RFID label of claim 15, wherein the spacer layer has a thickness between about 0.3 mm to about 0.8 mm.

21. The item having an RFID label of claim 15, wherein the spacer layer has a thickness between about 0.4 mm to about 0.6 mm.

22. The item having an RFID label of claim 15, wherein the dielectric substrate, the spacer layer, or both are formed of a closed cell foam material.

23. A method of tracking an item comprising:
applying an RFID label to the item;
the RFID label having a combined structure comprising an RFID component layer and an inductive component layer separated by and placed on opposite sides of a dielectric substrate;
the RFID component layer comprising an antenna segment having a first antenna segment and a second antenna segment, an integrated circuit located along the first antenna segment, a first capacitor segment attached to the first and second antenna segments, and a second capacitor segment attached to the first and second antenna segments, with the first capacitor segment being located on an opposite distal ends of the antenna segment from the second capacitor segment;
the inductive component layer having a first capacitor segment and a second capacitor segment being joined by a trace; the first capacitor segment of the inductive component aligning and coupling with the first capacitor segment of the RFID component layer, thereby forming a first capacitor assembly; the second capacitor segment of the inductive component aligning and coupling with the second capacitor segment of the RFID component layer, thereby forming a second capacitor assembly; the first and second capacitor assembly coupling the RFID component layer and the inductive component layer;
the combined structure adhered to a spacer layer;
the item having metallic packaging to which the spacer layer of the RFID label is adhered, the metallic packaging is a ground plane for the combined structure when the metallic packaging is coupled to the combined structure;
wherein the antenna segment radiates a plane wave when the combined structure is coupled to the metallic packaging.

24. The method of tracking an item of claim 23, wherein the dielectric substrate has a thickness between about 0.010 mm to about 0.050 mm.

25. The method of tracking an item of claim 23, wherein the dielectric substrate has a thickness between about 0.015 mm to about 0.04 mm.

26. The method of tracking an item of claim 23, wherein the dielectric substrate has a thickness between about 0.02 mm to about 0.03 mm.

27. The method of tracking an item of claim 23, wherein the spacer layer has a thickness between about 0.25 mm to about 1 mm.

28. The method of tracking an item of claim 23, wherein the spacer layer has a thickness between about 0.3 mm to about 0.8 mm.

29. The method of tracking an item claim 23, wherein the spacer layer has a thickness between about 0.4 mm to about 0.6 mm.

30. The method of tracking an item of claim 23, wherein the dielectric substrate, the spacer layer, or both are formed of a closed cell foam material.

* * * * *

UNITED STATES PATENT AND TRADEMARK OFFICE
CERTIFICATE OF CORRECTION

| | | |
|---|---|---|
| PATENT NO. | : 12,197,989 B2 | Page 1 of 1 |
| APPLICATION NO. | : 18/291320 | |
| DATED | : January 14, 2025 | |
| INVENTOR(S) | : Thomas Weakley | |

It is certified that error appears in the above-identified patent and that said Letters Patent is hereby corrected as shown below:

On the Title Page

Item (72) The inventor, Thomas Weakley's address should be changed to:
206 Hemingford Circle,
Simpsonville, South Carolina 29681
United States Signed and Sealed this
Twenty-ninth Day of April, 2025

Coke Morgan Stewart
*Acting Director of the United States Patent and Trademark Office*